United States Patent
Leu et al.

(10) Patent No.: US 7,504,138 B2
(45) Date of Patent: Mar. 17, 2009

(54) LIQUID CRYSTAL DISPLAY DEVICE

(75) Inventors: Chyi-Ming Leu, Taichung County (TW); Horng-Long Tyan, Hsinchu (TW); Tzong-Ming Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 237 days.

(21) Appl. No.: 11/318,567

(22) Filed: Dec. 28, 2005

(65) Prior Publication Data

US 2007/0065603 A1 Mar. 22, 2007

(30) Foreign Application Priority Data

Sep. 22, 2005 (TW) .............. 94132873 A

(51) Int. Cl.
*G02F 1/13363* (2006.01)
(52) U.S. Cl. ...................... 428/1.3; 349/117
(58) Field of Classification Search ............ 428/1.3, 428/1.6; 349/158, 117
See application file for complete search history.

(56) References Cited

U.S. PATENT DOCUMENTS

| | | | |
|---|---|---|---|
| RE33,342 E * | 9/1990 | Kohtoh et al. ............... 528/351 |
| 5,035,480 A * | 7/1991 | Dutt ............................ 385/24 |
| 5,344,916 A | 9/1994 | Harris et al. |
| 5,480,964 A | 1/1996 | Harris et al. |
| 5,694,496 A * | 12/1997 | Ando et al. ................... 385/11 |
| 5,731,405 A * | 3/1998 | Gibbons et al. .............. 528/353 |
| 5,907,378 A * | 5/1999 | Abileah et al. ............... 349/123 |
| 5,965,691 A * | 10/1999 | Gibbons et al. .............. 528/353 |
| 6,054,554 A * | 4/2000 | Choi et al. ................... 528/353 |
| 6,100,365 A * | 8/2000 | Matsumoto et al. ......... 528/170 |
| 6,455,208 B1 * | 9/2002 | Yamashiki et al. ............. 430/7 |
| 6,486,292 B2 * | 11/2002 | You et al. ..................... 528/170 |
| 6,525,791 B1 * | 2/2003 | Tsuda et al. .................. 349/106 |
| 6,562,422 B1 * | 5/2003 | Hong et al. .................... 428/1.2 |
| 6,710,160 B2 * | 3/2004 | Yamashita et al. ........... 528/353 |
| 6,734,276 B2 * | 5/2004 | Yamashita et al. ........... 528/170 |
| 2003/0104232 A1 * | 6/2003 | Kihara et al. ............. 428/473.5 |

FOREIGN PATENT DOCUMENTS

CN 1633613 6/2005
EP 1477828 11/2004

* cited by examiner

*Primary Examiner*—Keith D Hendricks
*Assistant Examiner*—Sophie Hon
(74) *Attorney, Agent, or Firm*—Birch, Stewart, Kolasch & Birch, LLP

(57) ABSTRACT

A liquid crystal display device comprises a color filter substrate and an array substrate. An optical compensation film is disposed on the color filter substrate and/or the array substrate, wherein the optical compensation film comprises a polyimide, comprising the following formula:

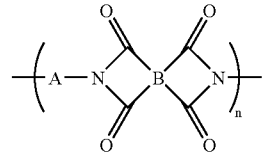

wherein n is an integer greater than 1, and wherein when A is cyclo-aliphatic compound, B is aromatic compound or cyclo-aliphatic compound, and when A is aromatic compound, B is cyclo-aliphatic compound.

4 Claims, 4 Drawing Sheets

LIQUID CRYSTAL DISPLAY DEVICE

BACKGROUND

The invention relates to a liquid crystal display device, and more particularly, to a liquid crystal display device with an optical compensation film.

Narrow viewing angle and low contrast ratio are provided by conventional liquid crystal display (LCD) devices. Different brightness levels occur when the display is viewed at different viewing angles. Brighter images are visible directly in front of the monitor but darker images from the sides. The disparity increases with LCD size.

Among wide-view technologies, optical compensation film is popular, since the wide angle of visibility is achieved with no change to the fabrication process, maintaining low costs. Good optical compensation can be achieved by effectively controlling thickness, birefringence, and transmittance of the optical compensation film.

Different LCD devices use different optical compensation film types, uniaxial and biaxial. Uniaxial optical compensation film can further be divided into A-plate and C-plate types. The refractive index of an A-plate optical compensation film obeys the formula $n_y = n_z \neq n_x$ ($n_x$ indicates refractive index in x-axis, $n_y$ and $n_z$ can be reasoned by analogy), with x-axis as its optical axis, parallel to a surface of a compensation film. The refractive index of a C-plate optical compensation film obeys the formula $n_y = n_x \neq n_z$, with z-axis as its optical axis, perpendicular to a surface of a compensation film. The refractive index of a biaxial optical compensation film obeys the formula $n_x \neq n_y \neq n_z$. A-plate optical compensation film can be obtained by stretching a polymer film in a single direction while negative C-plate and biaxial optical compensation film can be obtained by stretching a polymer film in one direction, then in another direction, but fabrication utilizing bi-direction stretching is difficult.

Negative C-plate optical compensation film provides negative birefringent properties using rigid polyimide or discotic liquid crystal coated on a substrate. This technique, as disclosed by Stephen Z. D. Cheng and Frank W. Harris of the University of Akron utilizes polyimide with aromatic structures as compensation film materials. However, the polyimide absorbs visible light, darkening the compensation film.

Optical compensation film with discotic liquid crystal was developed by Fuji Photo Film. Discotic liquid crystals are also negative C-plate liquid crystals, which compensate positive C-plate liquid crystal in an LCD device to provide a wide viewing angle. However, discotic liquid crystals are expensive and difficult to prepare.

U.S. Pat. Nos. 5,344,916 and 5,480,964 provide polyimide with aromatic structures. The polyimide with birefringent property is synthesized by diamine and dianhydride, both comprising benzene rings.

U.S. Pat. No. 5,344,916 discloses a polyimide with birefringent properties, synthesized by diamine and dianhydride, both comprising benzene rings. However, the polyimide is yellow or orange, unsuitable for applications requiring an optical compensation film to be transparent or colorless. Further, some monomers of this patent are too expensive for mass production.

U.S. Pat. No. 5,480,964 discloses a polyimide with birefringent properties, synthesized by diamine and dianhydride, both comprising biphenyl. However, this compensation film of this polyimide is also colored, unsuitable for applications requiring an optical compensation film to be transparent or colorless. Further, low solubility is produced, and some monomers thereof are not easy to synthesize, increasing costs of mass production.

SUMMARY

Thus, an improved liquid crystal display device is provided. In an embodiment, a liquid crystal display device comprises a color filter substrate and an array substrate. An optical compensation film is disposed on the color filter substrate and/or the array substrate, wherein the optical compensation film comprises a polyimide, comprising the following formula:

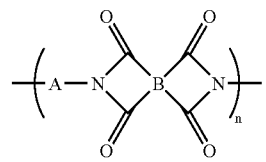

wherein n is an integer greater than 1, and wherein when A is cyclo-aliphatic compound, B is aromatic compound or cyclo-aliphatic compound, and when A is aromatic compound, B is cyclo-aliphatic compound.

Polyimide according to the invention provides high solubility in various organic solvents, good optical compensation, high transmittance, good workability, lighter color, and applicability in fabrication of optical compensation film on an LCD device. Further, since materials used in the invention are common commercial products, it is suitable for mass production with lower costs.

The polyimide according to the invention can be synthesized by cyclo-aliphatic diamine plus aromatic dianhydride, cyclo-aliphatic diamine plus cyclo-aliphatic dianhydride and aromatic dianhydride at various ratios, aromatic diamine plus cyclo-aliphatic dianhydride, or cyclo-aliphatic diamine and aromatic diamine at various ratios plus cyclo-aliphatic dianhydride.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1A:
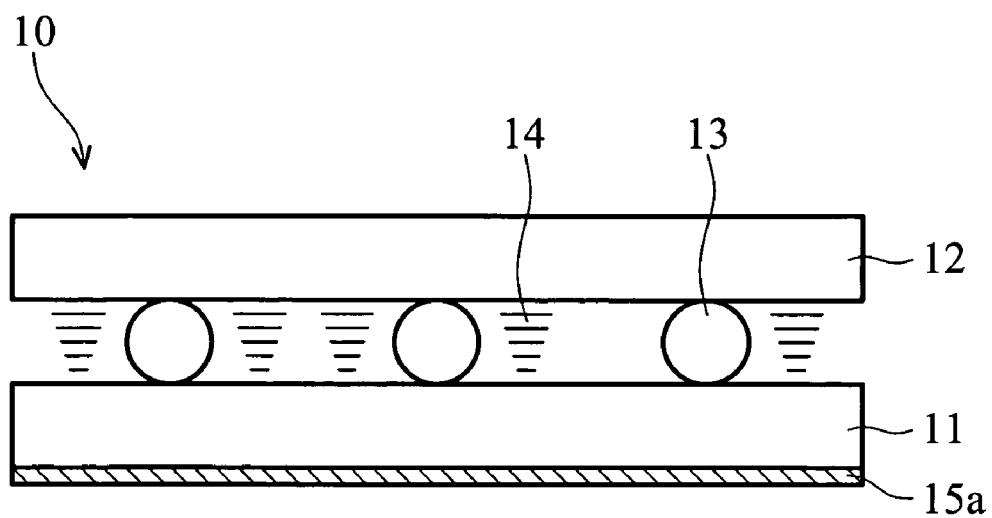
FIGS. 1a to 1c are cross-sections of LCD devices according to various embodiments of the invention.

FIG. 1*a* shows a liquid crystal display device 10 comprising an array substrate 11, a color filter substrate 12, spacers 13, liquid crystal material 14, and optical compensation film 15*a*. The color filter substrate 12 is formed opposite to the array substrate 11, spacers 13 and liquid crystal materials 14 are formed between the two substrates 11 and 12, and an optical compensation film 15*a* is formed on the outside of the array substrate 11.

In the figures, "15*a*" indicates a compensation film formed on the array side, and "15*b*" indicates a compensation film formed on the color filter side.

Figure 1B:
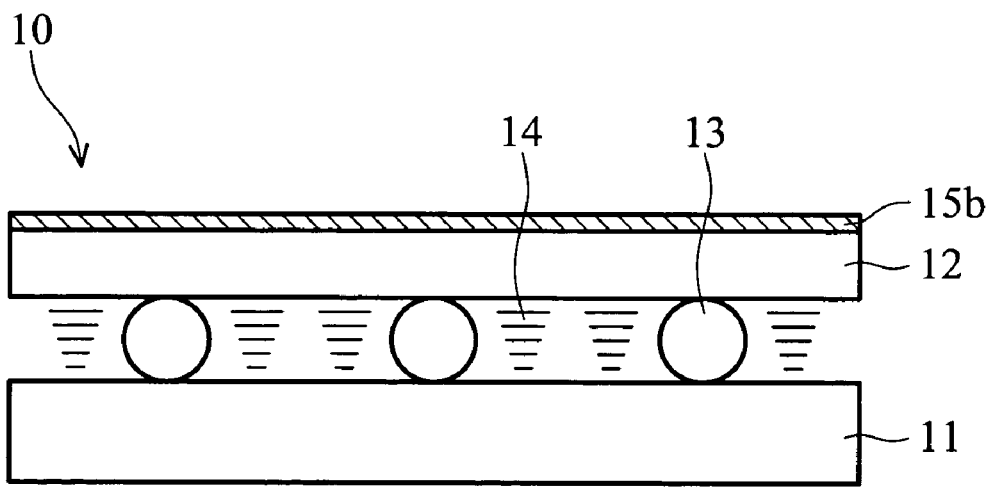
Figure 1C:
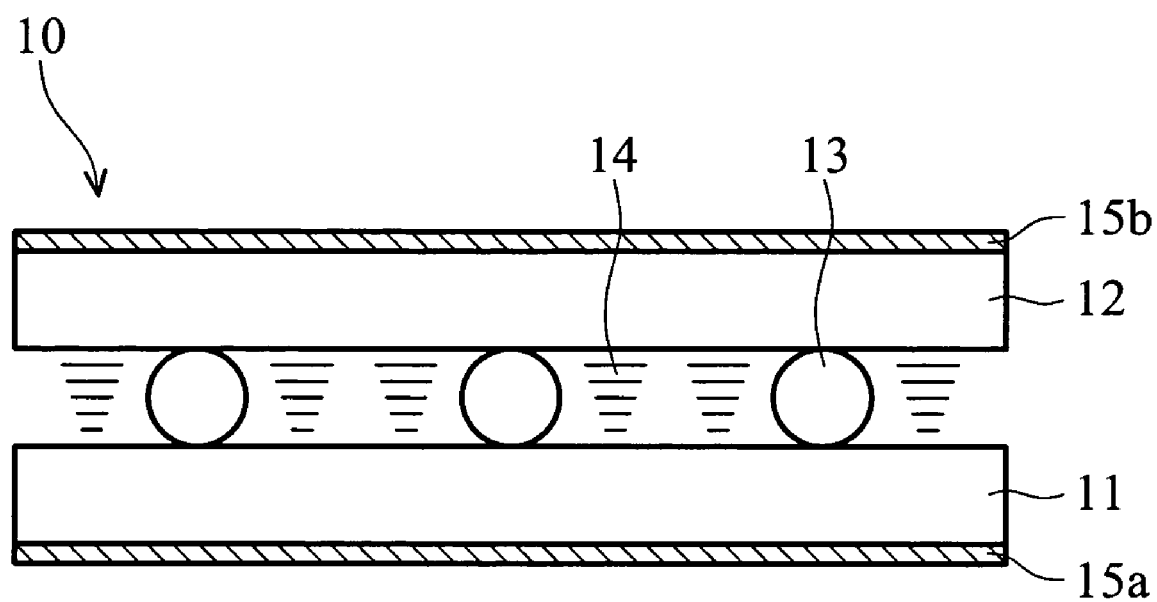

In an embodiment of the invention, an optical compensation film 15*a* is formed on the outside surface of array substrate 11 as shown in FIG. 1*a*, an optical compensation film 15*b* can be formed on the outside surface of the color filter substrate 12 as shown in FIG. 1*b*, or, as shown in FIG. 1*c*, optical compensation films 15*a* and 15*b* can both be formed on the outside surfaces of the two substrates 11 and 12 respectively.

Figure 2A:
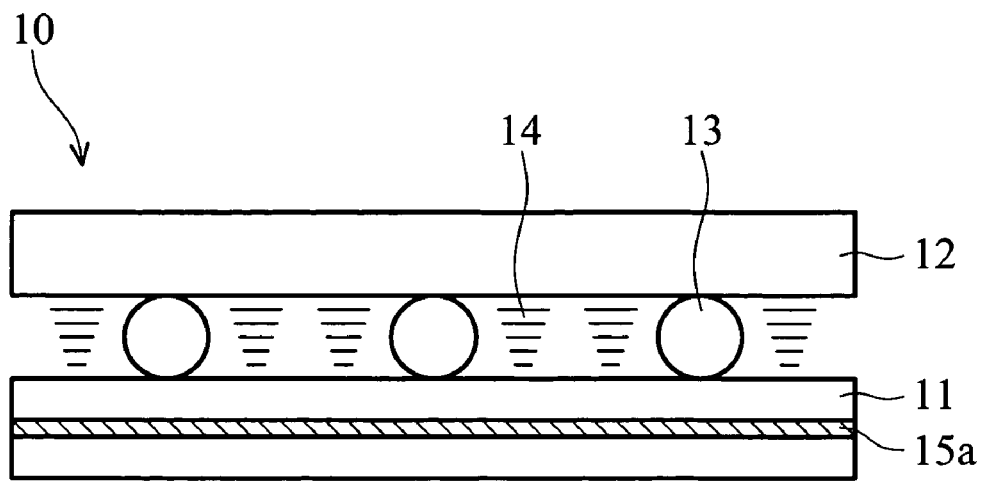
FIGS. 2a to 2b are cross-sections of LCD devices according to other embodiments of the invention.
Figure 2B:
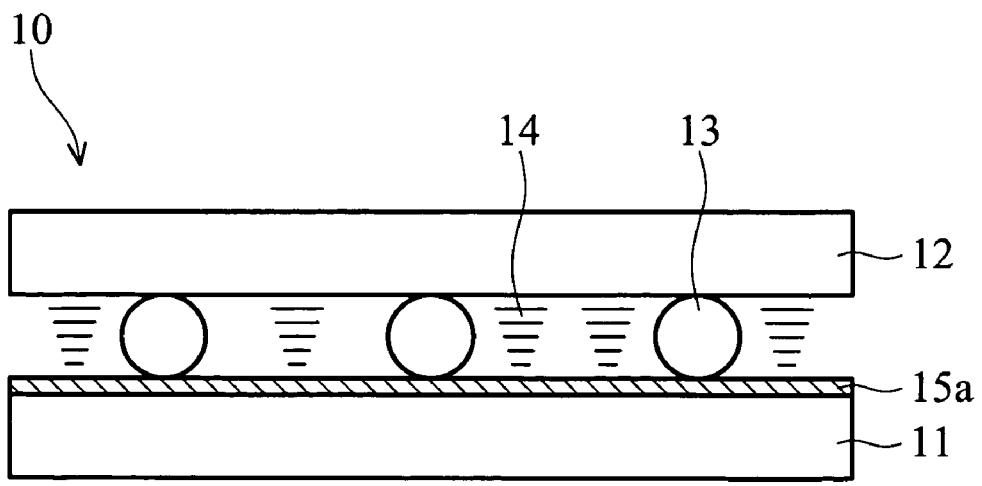

In another embodiment of the invention, an optical compensation film is formed in the array substrate 11 as shown in FIG. 2*a*, on the inside surface of the array substrate 11 as shown in FIG. 2*b*, or in/outside/inside the two substrates 11 and 12 (not shown), providing a wide viewing angle.

The optical compensation film 15*a* or 15*b* in an embodiment of the invention comprises polyimide having the formula:

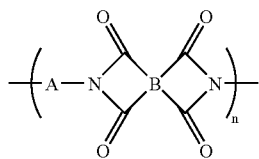

wherein n is an integer greater than 1, preferably from 10 to 10000, and A and B denote specific compounds respectively. For example, when A is cyclo-aliphatic compound, B is aromatic compound or cyclo-aliphatic compound, and when A is aromatic compound, B is cyclo-aliphatic compound.

When A is cyclo-aliphatic compound, B is aromatic compound or cyclo-aliphatic compound. In this case, A is

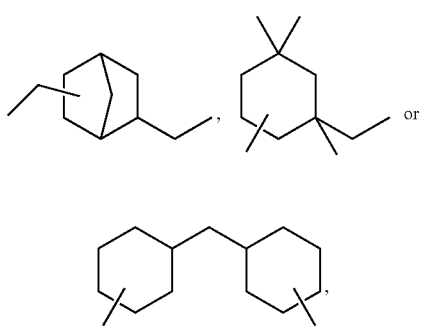

B is

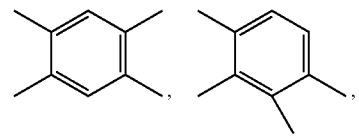

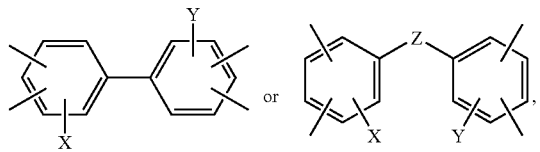

X and Y are —H, —CH$_3$, —CF$_3$, —OH, —OR, —Br, —Cl or —I, R is alkyl of from 1 to 18 carbons, Z is —O—, —CH$_2$—, —C(CH$_3$)$_2$—, —Ar—O—Ar—, —Ar—CH$_2$—Ar—, —O—Ar—C(CH$_3$)$_2$—Ar—O—, —O—Ar—Ar—O—, —O—Ar—C(CF$_3$)$_2$—Ar—O— or —Ar—C(CH$_3$)$_2$—Ar—, and Ar is benzene, or

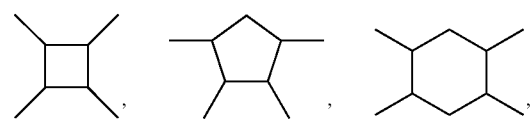

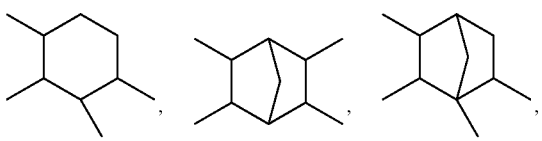

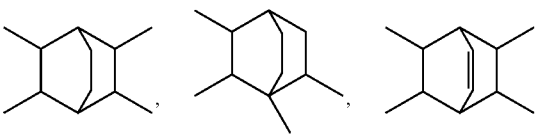

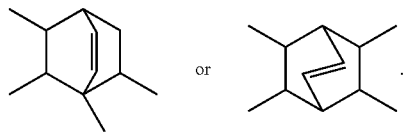

When A is aromatic compound, B is cyclo-aliphatic compound. In this case, A is

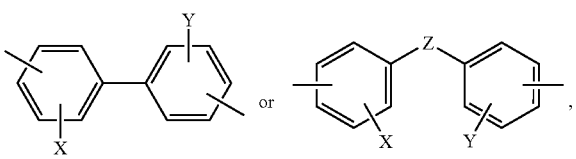

X and Y are —H, —CH$_3$, —CF$_3$, —OH, —OR, —Br, —Cl or —I, R is alkyl of from 1 to 18 carbons, Z is —O—, —CH$_2$—, —C(CH$_3$)$_2$—, —Ar—O—Ar—, —Ar—CH$_2$—

Ar—, —O—Ar—C(CH₃)₂—Ar—O—, —O—Ar—Ar—O—, —O—Ar—C(CF₃)₂—Ar—O— or —Ar—C(CH₃)₂—Ar—, and Ar is benzene, B is

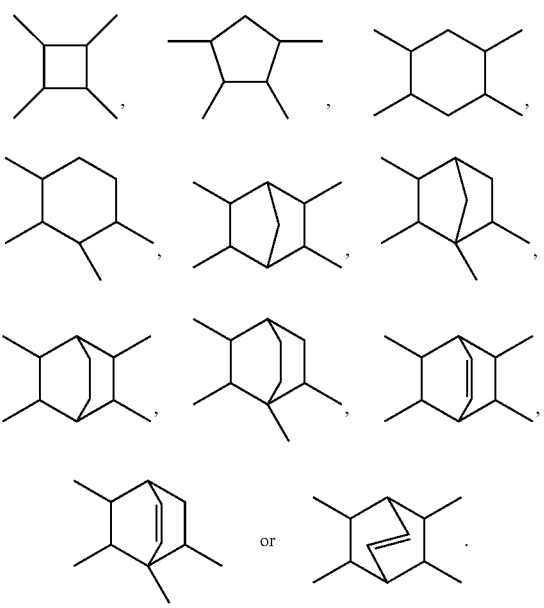

or

Besides, the polyimide in an embodiment of the invention can be a copolymer as formula (I):

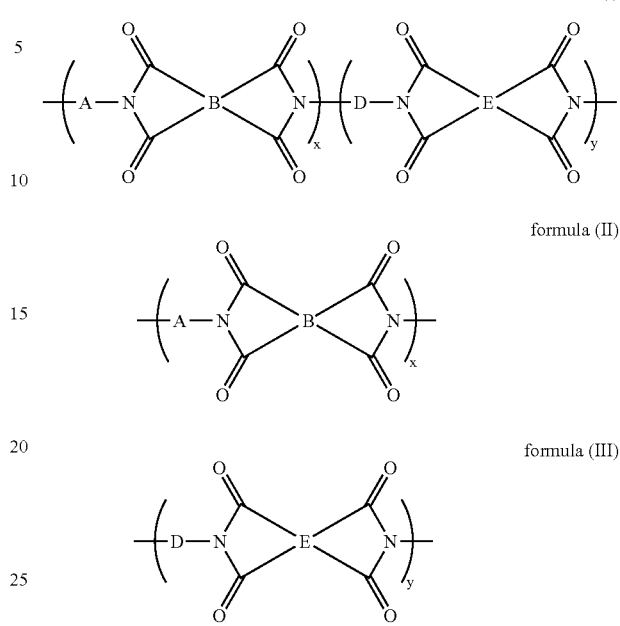

In formula (I), x and y are integers greater than 1, preferably from 10 to 10000. It is noted that the polyimide of formula (I) can be a random copolymer or a block copolymer consisting of formula (II) and formula (III). The rules for D and E are the same as for A and B.

Table 1 shows twelve embodiments of the polyimide comprising formula (I), formula (II) or formula (III).

| polymer | Structure |
|---|---|
| 1 | |
| 2 | |
| 3 | |

-continued

Table 1 shows twelve embodiments of the polyimide comprising formula (I), formula (II) or formula (III).

| polymer | Structure |
|---|---|
| 4 | |
| 5 | |
| 6 | |
| 7 | |
| 8 | |
| 9 | |
| 10 | |

-continued

Table 1 shows twelve embodiments of the polyimide comprising formula (I), formula (II) or formula (III).

| polymer | Structure |
| --- | --- |
| 11 | (structure with CH₃/H₃C-substituted biphenyl, cycloaliphatic imide, and ether-linked bisphenol imide blocks) |
| 12 | (structure with CF₃-substituted biphenyl imide block and Br-substituted biphenyl imide block) |

The common feature of the embodiments shown is "cyclo-aliphatic compound". Since cyclo-aliphatic compound cannot absorb visible light (wavelength is between about 400-700 nm), the polyimide film according to the invention is lighter in color, and thus suitable for an optical compensation film. It should be noted that while the invention presents the twelve embodiments shown in table 1, other embodiments can further be used.

Syntheses of polyimide involve typical poly-condensation reaction, utilizing one and two-step procedures.

One-Step Procedure for Polyimide

Monomers of diamine and dianhydride were added to a solution of m-cresol or Cl-phenol under $N_2$ or other inert gas at reflux temperature to form polyimide. An example of the one-step procedure is:

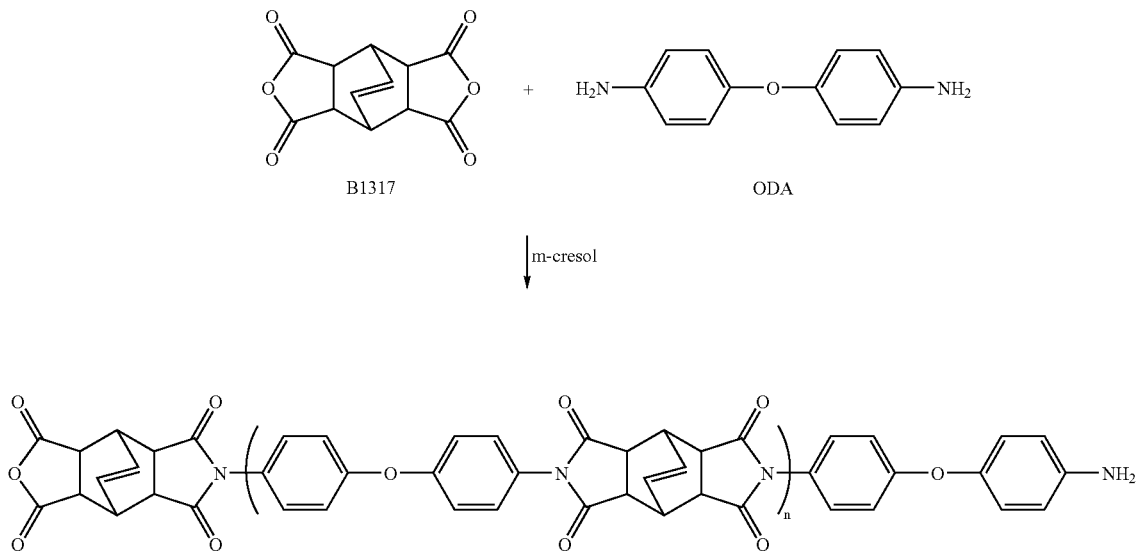

Two-Step Procedure for Polyimide

Monomers of diamine and dianhydride were added to a polar solvent under $N_2$ or other inert gas to form a precursor of polyimide, polyamic acid, polyamic acid was imidizated by thermal or chemical methods. Water distilled from polyamic acid and close-looped, to form a polyimide. An example of a two-step procedure is:

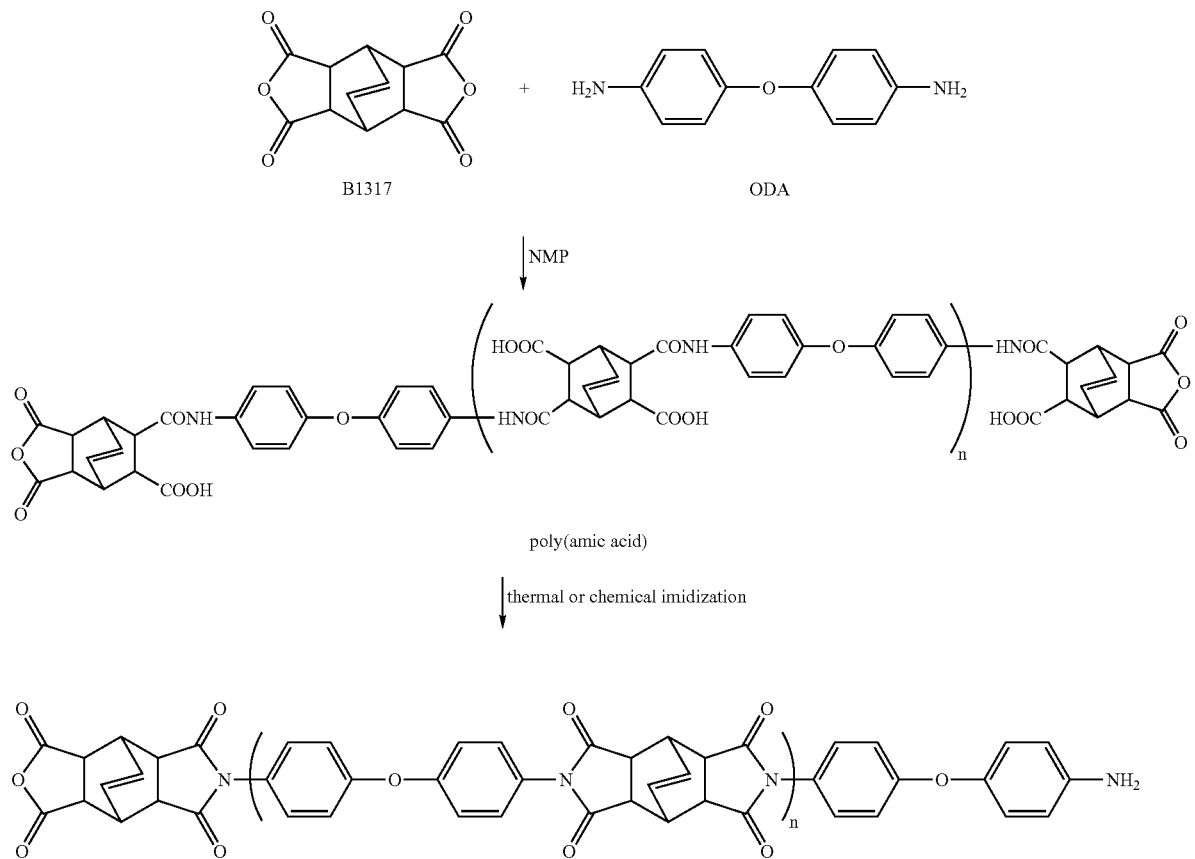

In the procedure, B1317 is Bicyclo[2.2.2]oct-7-ene-2,3,5,6-tetracarboxylic dianhydride; ODA is oxydianiline, and NMP is N-methyl-2-pyrrolidone.

The invention will be better understood by reference to the following illustrative and non-limiting representative embodiments, selected from Table 1 of polymer 4, polymer 5, polymer 8, or polymer 11, showing the preparation of polyimide, and comparing the experimental results.

Comparison: 6FDA-PFMB

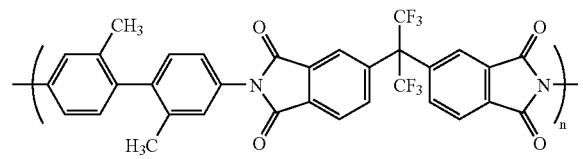

0.0147 mole of 2,29-bis(trifluoromethyl)-4,49-diaminobiphenyl (PFMB) was added to a stirred solvent of 32.94 grams of m-cresol in a three-necked bottle under $N_2$ at room temperature. After the PFMB dissolved, 0.015 mole of 2,2'-bis-(3,4-dicarboxyphenyl)hexafluoropropane dianhydride (6FDA) was added to the solution. After the 6FDA dissolved, the solution was stirred for 1 hour, and a paste solution of polyamic acid was formed and heated to about 220° C., the temperature maintained for 3 hours. Water was allowed to distill from the solution, and a reaction mixture containing polyimide was formed. After the mixture was allowed to cool to room temperature, it was slowly added to methanol, and polyimide precipitated. The precipitated polyimide was collected by filtration, and dried under reduced pressure (by vacuum oven) for 12 hours.

Embodiment 1: B1317-BAPPm

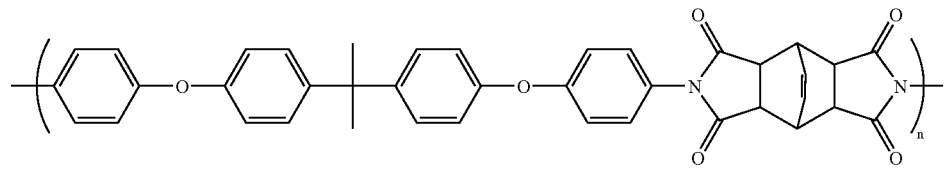

0.0147 mole of 4,4'-bis(aminophenoxy)propane(BAPPm) was added to a stirred solvent of 32.94 grams of m-cresol in a three-necked bottle under $N_2$ at room temperature. After the BAPPm dissolved, 0.015 mole of bicyclo[2.2.2]oct-7-ene-2, 3,5,6-tetracarboxylic dianhydride (B1317) was added to the solution. After the B1317 dissolved, the solution was stirred for 1 hour, and a paste solution of polyamic acid was formed and heated to about 220° C., the temperature maintained for 3 hours. Water was allowed to distill from the solution, and a reaction mixture containing polyimide was formed. After the mixture was allowed to cool to room temperature, it was slowly added to methanol, and polyimide precipitated. The precipitated polyimide was collected by filtration, and dried under reduced pressure (by vacuum oven) for 12 hours.

Embodiment 2: B1317-BAPPm-co-B1317-IPDA

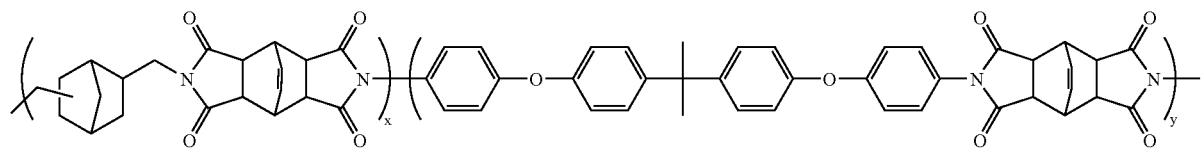

0.0118 mole of BAPPm and 0.0030 mole of isophorone diamine (IPDA) were added to a stirred solvent of 32.94 grams of m-cresol in a three-necked bottle under $N_2$ at room temperature. After the BAPPm and IPDA dissolved, 0.015 mole of B1317 was added to the solution. After the B1317 dissolved, the solution was stirred for 1 hour, and a paste solution of polyamic acid was formed and heated to about 220° C., the temperature maintained for 3 hours. Water was allowed to distill from the solution, and a reaction mixture containing polyimide was formed. After the mixture was allowed to cool to room temperature, it was slowly added to methanol, and polyimide precipitated. The precipitated polyimide was collected by filtration, and dried under reduced pressure (by vacuum oven) for 12 hours.

Embodiment 3: B1317-m-TB-HG

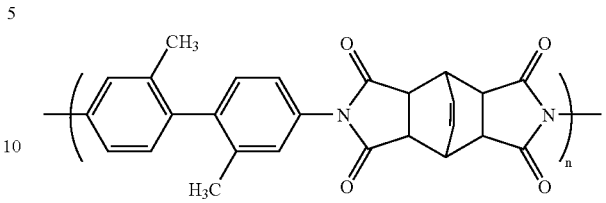

0.0147 mole of 2,2'-Dimethyl-4,4'-diamino biphenyl (m-TB-HG) was added to a stirred solvent of 32.94 grams of m-cresol in a three-necked bottle under $N_2$ at room temperature. After the m-TB-HG dissolved, 0.015 mole of B1317 was added to the solution. After the B1317 dissolved, the solution was stirred for 1 hour, and a paste solution of polyamic acid was formed and heated to about 220° C., the temperature maintained for 3 hours. Water was allowed to distill from the solution, and a reaction mixture containing polyimide was formed. After the mixture was allowed to cool to room temperature, it was slowly added to methanol, and polyimide precipitated. The precipitated polyimide was collected by filtration, and dried under reduced pressure (by vacuum oven) for 12 hours.

Embodiment 4:
B1317-BAPPm-co-B1317-m-TB-HG

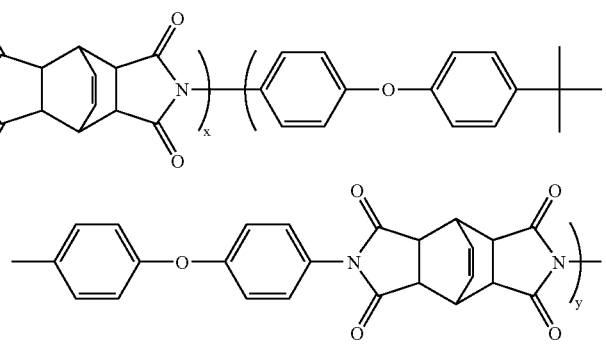

0.0074 mole of BAPPm and 0.0074 mole of m-TB-HG were added to a stirred solvent of 32.94 grams of m-cresol in a three-necked bottle under $N_2$ at room temperature. After the BAPPm and m-TB-HG dissolved, 0.015 mole of B1317 was added to the solution. After the B1317 dissolved, the solution was stirred for 1 hour, and a paste solution of polyamic acid was formed and heated to about 220° C., the temperature maintained for 3 hours. Water was allowed to distill from the solution, and a reaction mixture containing polyimide was formed. After the mixture was allowed to cool to room temperature, it was slowly added to methanol, and polyimide precipitated. The precipitated polyimide was collected by filtration, and dried under reduced pressure (by vacuum oven) for 12 hours.

Figure 3:
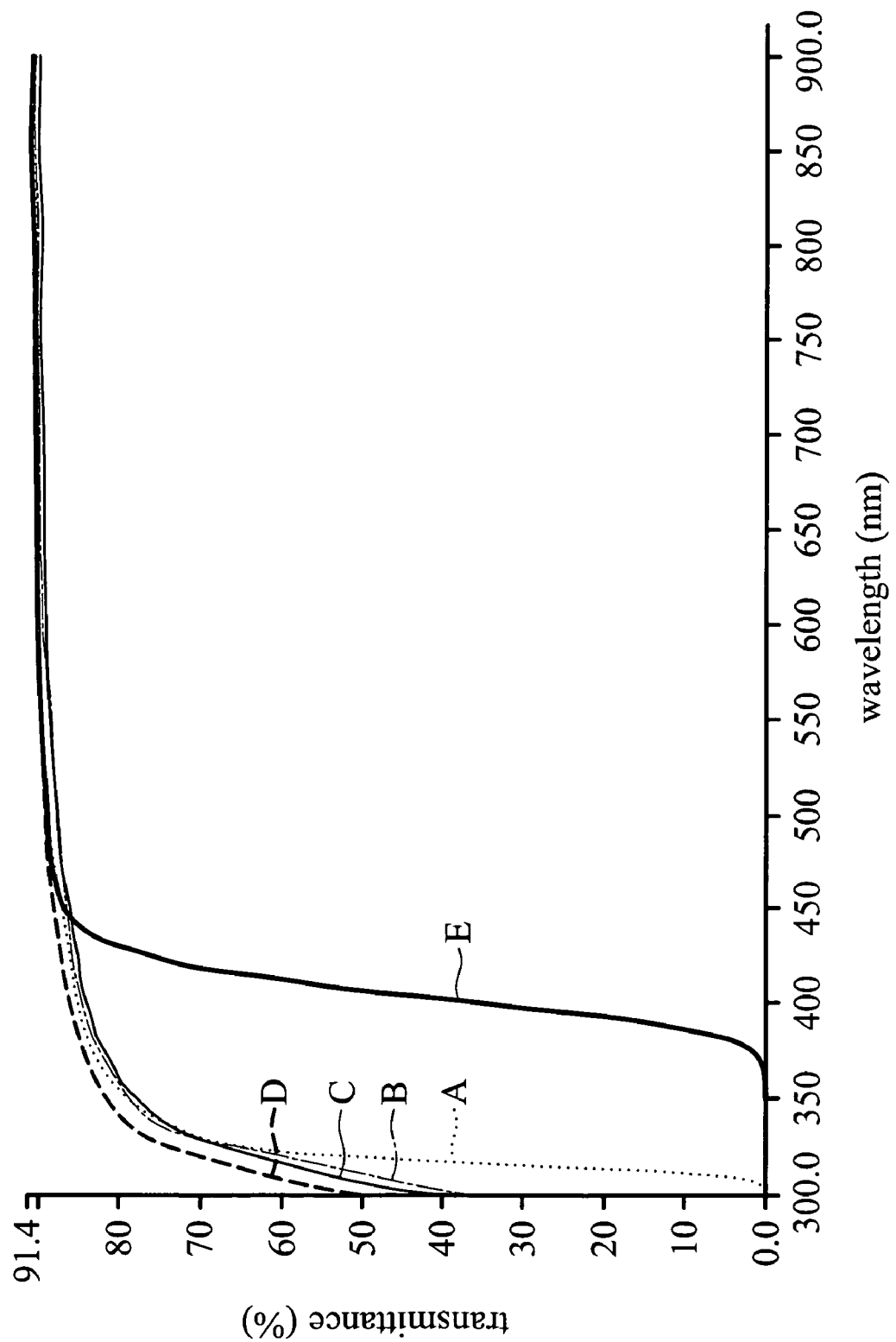
FIG. 3 shows the ultraviolet-visible spectrum of embodiments according to the invention.

Experimental results of the above embodiments are shown in FIG. 3, an ultraviolet-visible spectrum of the embodiments, with x-axis indicating wavelengths of a light source, and y-axis transmittances of samples passed therethrough. Curves A, B, C, and D indicate the experimental results of embodiments 1, 2, 3, and 4 respectively, and curve E the experimental result of the comparison.

As shown in FIG. 3, the polyimide films of embodiments 1, 2, 3, and 4 show a lighter color than the comparison since the component "cyclo-aliphatic compound" therein is unabsorbable to visible light. For example, as shown in FIG. 3, transmittance of the compared polyimide to 400 nm light is only about 30%, but transmittance of the embodiments according to the invention to 400 nm light can reach about 85%, indicating that the polyimide film according to the invention shows a lighter color than the comparison, demonstrating suitability for fabrication of optical compensation film.

Preparation of tested samples was as follows. Polyimide was diluted with water to 20 wt %, and the solution coated on a polyethylene terephthalate (PET) substrate by a blade. After drying, a polyimide film was formed (average thickness about 10 microns). The polyimide film is ripped from the PET substrate and tested for UV spectrum (instrumental type: Perkin Elemer Lambda 900).

Polyimide according to the invention provides high solubility in various organic solvents, good optical compensation, high transmittance, good workability, lighter color, and suitability for fabrication of optical compensation film on an LCD device. Further, since materials used in the invention are common commercial products, it is suitable for mass production with lower costs.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A liquid crystal display device, comprising:
a color filter substrate and an array substrate; and
an optical compensation film, disposed on the color filter substrate and/or the array substrate, wherein the optical compensation film comprises a polyimide, and the polyimide is:

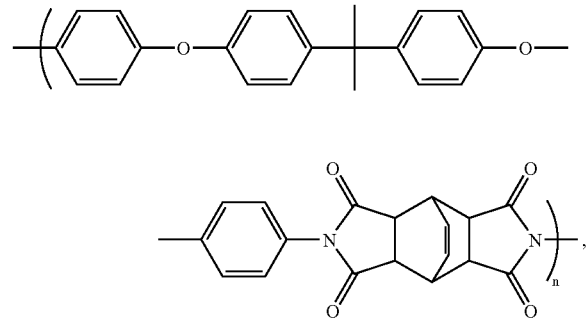

wherein n is an integer greater than 1.

2. A liquid crystal display device, comprising:
a color filter substrate and an array substrate; and
an optical compensation film, disposed on the color filter substrate and/or the array substrate, wherein the optical compensation film comprises a polyimide, and the polyimide is:

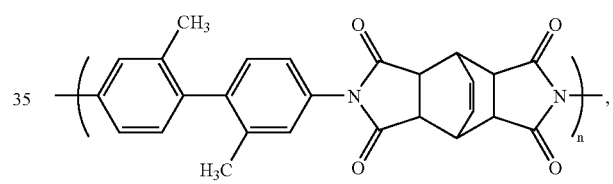

wherein n is an integer greater than 1.

3. A liquid crystal display device, comprising:
a color filter substrate and an array substrate: and
an optical compensation film, disposed on the color filter substrate and/or the array substrate, wherein the optical compensation film comprises a polyimide, and the polyimide is:

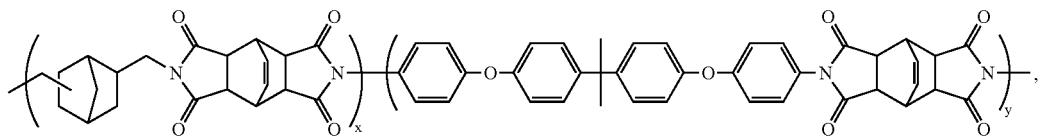

wherein x and y integers greater than 1.

4. A liquid crystal display device, comprising:
a color filter substrate and an array substrate; and
an optical compensation film, disposed on the color filter substrate and/or the array substrate, wherein the optical compensation film comprises a polyimide, and the polyimide is as follows:

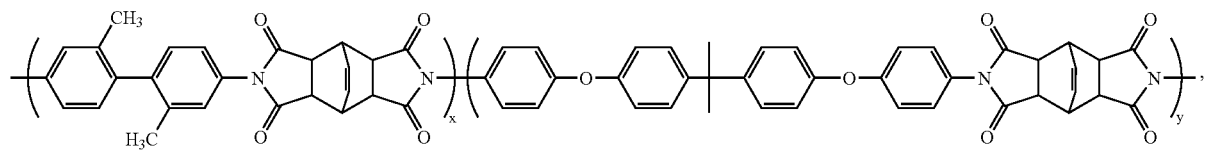
wherein x and y are integers greater than 1.
* * * * *